United States Patent

Pyszczek et al.

[11] Patent Number: 5,415,959
[45] Date of Patent: May 16, 1995

[54] WOVEN SYNTHETIC HALOGENATED POLYMER FIBERS AS SEPARATOR MATERIAL FOR ELECTROCHEMICAL CELLS

[75] Inventors: Michael F. Pyszczek, LeRoy; Christine A. Frysz, East Amherst; Steven J. Ebel, Tonawanda; Esther S. Takeuchi, Williamsville, all of N.Y.

[73] Assignee: Wilson Greatbatch Ltd., Clarence, N.Y.

[21] Appl. No.: 145,782

[22] Filed: Oct. 29, 1993

[51] Int. Cl.⁶ .............................. H01M 2/14
[52] U.S. Cl. .................... 429/249; 429/254; 139/420 A; 139/420 R
[58] Field of Search .............. 429/249, 254; 139/420 A, 420 R

[56] References Cited

U.S. PATENT DOCUMENTS

| | | |
|---|---|---|
| 2,804,886 | 9/1957 | White .................. 139/420 A |
| 2,853,537 | 9/1958 | Corren .................. 136/145 |
| 3,661,645 | 5/1972 | Strier et al. .................. 136/20 |
| 3,953,241 | 4/1976 | Langh et al. |
| 4,320,181 | 3/1982 | Habich et al. .................. 429/59 |
| 4,629,666 | 12/1986 | Schlaikjer .................. 429/194 |
| 4,965,147 | 10/1990 | Mas et al. .................. 429/136 |
| 4,980,250 | 12/1990 | Takahashi et al. .................. 429/194 |
| 5,002,843 | 3/1991 | Cieslak et al. .................. 429/101 |
| 5,059,498 | 10/1991 | Hisatomi et al. .................. 429/196 |
| 5,158,844 | 10/1992 | Hagens et al. .................. 429/249 |
| 5,262,234 | 11/1993 | Minor et al. .................. 428/372 |

Primary Examiner—Prince Willis, Jr.
Assistant Examiner—M. Nuzzolillo
Attorney, Agent, or Firm—Hodgson, Russ, Andrews, Woods & Goodyear

[57] ABSTRACT

A fabric separator woven from synthetic halogenated polymeric fibers for use in an electrochemical cell comprising a Group IA, IIA and IIIB metal anode and a depolarizer/catholyte or a solid cathode/electrolyte system, is described. The separator is resistant to the highly oxidizing components present in the cell, is tear resistant and has a reduced thickness to minimize the diminishing effect of the separator on the volumetric amount of active components in the cell. The separator can be used by itself or as a laminate with a microporous film, preferably made of a fluoropolymeric fiber.

24 Claims, 4 Drawing Sheets

WOVEN SYNTHETIC HALOGENATED POLYMER FIBERS AS SEPARATOR MATERIAL FOR ELECTROCHEMICAL CELLS

This invention was made with Government support under Contract N00014-89-C-0232 awarded by the Department of Navy. The Government has certain rights in the invention.

BACKGROUND OF THE INVENTION

1. Field of the Invention

This invention relates generally to electrochemical cells and more particularly to a new and improved separator for such cells and of fabric material. This fabric separator is particularly useful in an electrochemical cell having an anode comprising a Group IA, IIA and IIIB metal and a depolarizer/catholyte or a solid cathode/electrolyte system.

Fundamental requirements of a separator for use in an electrochemical cell is that the material of construction be resistant to degradation in the cell environment, have sufficient thickness to maintain interelectrode separation without interfering with cell high performance, and exhibit sufficient surface energy such that electrolyte wettability and absorption are augmented. The separator material must also have a relatively high electrical resistivity in order to prohibit the establishment of short circuit currents flowing directly between the electrodes, through the separator. These requirements are balanced by the need for the separator to have sufficient porosity such that electrode separation is maintained while allowing ionic transfer within the electrolyte to occur unimpeded during intended cell discharge. Additionally, the separator must have sufficiently strong tensile properties to facilitate cell fabrication and to further withstand internal cell stresses due to changes in electrode volume during discharge and re-charging cycles in secondary electrochemical cells.

2. Prior Art

Conventionally, separators have fallen into two general categories - those made of microporous films and those comprising a non-woven fabric made from glass fibers and polymeric fibers. The former type of separator material is shown in Schlaikjer U.S. Pat. No. 4,629,666, which discloses partially halogenated microporous polymeric films for use as a separator in electrochemical cells containing alkali metals, such as lithium, and inorganic electrolytes. Similarly, a microporous film separator comprising polytetrafluoroethylene (PTFE) for use in an electrochemical cell is also disclosed in Strier U.S. Pat. No. 3,661,645 et al. The PTFE film is provided with particles of a substance that is insoluble in water, but which can be leached from the film to produce uniformly distributed pores therein. The benefit is that microporous films can be made very thin which contributes to volumetric efficiency in that the separator does not detract appreciably from the volume of cathode and anode active material and therefore the energy density. The problem is that the reduction in separator thickness is accompanied by a reduction in material strength as microporous films are inherently weak. Rupture of the separator during the manufacturing process is not uncommon and can lead to contact between the electrode materials, thereby resulting in an internal short circuit condition.

The latter, non-woven fabric type of separator is shown in Cieslak U.S. Pat. No. 5,002,843 et al., which discloses a lithium/thionyl chloride electrochemical cell system having a separator made of aramid fibers provided in a non-woven mat form. Although aramid fibers are highly porous and, therefore, not a detriment to ionic transfer within the depolarizer/catholyte, non-woven fabrics are easily torn. In a similar manner as microporous films, the use of non-woven fabric as a separator in an electrochemical cell can result in direct physical contact between the electrodes which would give rise to an internal short circuit condition.

SUMMARY OF THE INVENTION

The present invention provides a woven fabric separator comprising halogenated polymer fibers for use in the construction of an electrochemical cell having an anode consisting of a metal or alloy of metals from Groups IA, IIA and IIIB of the Periodic Table of the Elements, and having a depolarizer/catholyte or a solid cathode/electrolyte system. These electrochemical cell systems comprise strongly oxidizing materials. It is therefore critical for safety and performance aspects that the separator be made of a material which is compatible with the corrosive media present inside the electrochemical cells in addition to having mechanical properties that lend themselves to ready fabrication of such cells.

It is therefore an object of the present invention to provide in a high energy density electrochemical cell which employs strongly oxidizing materials as active components, a new and improved separator which is chemically compatible within the cell environment.

It is another object to provide such a separator that has sufficiently strong tensile properties to facilitate cell fabrication without tearing or otherwise experiencing breaching of the separator integrity.

Still another object is to provide such a separator that exhibits sufficient permeability so that electrode separation is maintained while providing for unimpeded ionic transfer within the electrolyte.

Yet another object is to provide such a separator which has a sufficiently reduced thickness that minimizes the diminishing effect of separator material on the volumetric amount of active components in a high energy density electrochemical cell.

It is a further object to provide such a separator having chemical properties that include: a requisite surface energy such that the electrolyte of an electrochemical cell wets and is absorbed into the separator material; a sufficiently high purity such that cell performance is not adversely affected; a melting range which is compatible with the anticipated electrochemical cell applications; the ability to heat seal and thus encapsulate the cell components; and an acceptable thickness to minimize electrode separation while maintaining high energy density performance.

The foregoing and additional advantages and characterizing features of the present invention will become increasingly apparent to those of ordinary skill in the art by reference to the following description and to the drawings.

DETAILED DESCRIPTION OF THE INVENTION

The electrochemical cell of the present invention is constructed having a woven fabric separator comprising halogenated polymeric fibers that provide separation between the anode and the cathode active components in an electrochemical cell. Fabric separators made from halogenated polymeric fibers are tear resistant, chemically unreactive and are electrically insulative to prevent internal electrical short circuit conditions between the electrode components in the cell. Such woven fabric separators are also chemically unreactive and insoluble in the electrolyte solution. In addition, woven fabric separators of halogenated polymeric fibers have a high degree of porosity that is sufficient to allow flow therethrough of the electrolytic solution during the electrochemical reaction of a solid cathode/anode cell system.

Examples of halogenated polymeric materials suitable for this application include, but are not limited to, polyethylenetetrafluoroethylene which is commercially available under the name Tefzel, a trademark of the DuPont Company; polyethylenechlorotrifluoroethylene which is commercially available under the name Halar, a trademark of the Allied Chemical Company; and polyvinylidine fluoride. Electrochemical cells constructed using halogenated polymeric fibers configured as a woven fabric separator are substantially more resistant to physical abuse than prior art cells having separators comprising microporous films and non-woven fabrics.

Figure 1:
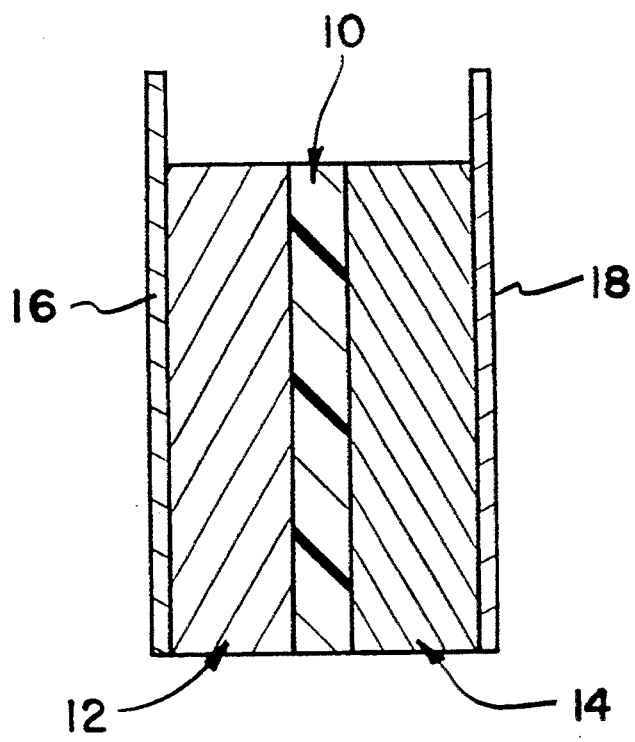
FIG. 1 is a diagrammatic view of an electrochemical cell provided with a separator 10 according to the present invention.

As shown in FIG. 1, the woven fabric separator 10 of the present invention is thus placed between the anode 12 and cathode 14 of the electrochemical cell in a manner preventing physical contact between the active materials. Anode material acceptable for use with the present woven fabric separator comprise metals, selected from Groups IA, IIA and IIIB of the Periodic Table of the Elements. More specifically the anode material may consist of lithium, sodium, potassium, calcium, magnesium or their alloys, or any alkali metal or alkali-earth metal capable of functioning as an anode. For example, Li-Si, Li-Al, Li-B and Li-Si-B alloys may serve as the anode material. The form of the anode may vary, but typically, the anode comprises a thin sheet or foil of the anode metal, and a current collector 16 having an extended tab or lead affixed to the anode material.

The electrochemical cell can be a solid cathode cell having, but not limited to, cathodes such as manganese dioxide, silver vanadium oxide, titanium disulfide, copper oxide, copper sulfide, iron sulfide, iron disulfide and fluorinated carbon, or the electrochemical cell can comprise a liquid depolarizer/catholyte such as sulfur dioxide or oxyhalides including phosphoryl chloride, thionyl chloride and sulfuryl chloride used individually or in combination with each other or in combination with halogens and interhalogens, such as bromine trifluoride, or other electrochemical promoters or stabilizers.

In the case of solid cathode materials, the cathode may be pressed into a pellet with the aid of a suitable binder material, such as polytetrafluoroethylene, and a material having electronic conduction characteristics, such as graphite. In some cases, no binder material or electronic conductor material is required to provide a suitable cathode body. Further, some of the cathode matrix samples may also be prepared by rolling, spreading or pressing a mixture of the materials mentioned above onto a suitable current collector such as Exmet wire mesh. The prepared cathode bodies as described above may be used as either a solid cathode prepared by directly pressing the material into a battery can assembly or a wound cathode structure similar to a "jellyroll". A cathode current collector and extending lead is represented diagrammatically at 18 in FIG. 1.

By way of an example of a solid cathode cell, the woven separator of the present invention can be used with the highly oxidizing Li/BrF$_3$ system. Such an electrochemical cell typically comprises a cathode consisting of a high surface area carbon formed by compressing a dry carbon black/PTFE mixture onto an expanded metal current collector. The anode comprises a section of pure lithium metal into which a current collector tab is pressed. Electrical insulation of the electrodes is preferably accomplished through the use of a two layer separator arrangement comprising a first microporous polyethylenetetrafluoroethylene (ETFE) film located adjacent to the carbon cathode to provide a positive barrier to dislodged carbon particles and a second woven layer comprising (ETFE) and positioned facing the anode. The woven layer imparted a high degree of mechanical strength to the separator assembly and the microporous film prevents puncture of the separator especially with cells having fibrous cathode material such as carbon. Carbon fibers have a tendency to puncture separators made according to the prior art, but not the woven fabric separator of the present invention.

In addition to being tear resistant the compatible surface energy of the ETFE fibers allowed the bromine trifluoride catholyte to be readily absorbed and transported into the interelectrode gap. The depolarizer solution can comprise straight $BrF_3$ or bromine trifluoride in combination with a suitable salt, such as $LiBF_4$ and $LiAsF_6$.

The woven separator of the present invention is also not limited to active batteries which are considered to be disposable following the completion of a single discharge of their active components. The woven fabric separator may also be used with secondary electrochemical cells which can be discharged and recharged many times before disposal of the cell becomes necessary and with reserve cell types where the electrical cell is activated when it is to be used.

Benefits realized from use of a halogenated polymeric fiber woven into a fabric sheet for use as a separator in an electrochemical cell according to the present invention are illustrated further by the following examples.

EXAMPLE I

A single layer of polyotheylenetrifluoroethylene (Tefzel) woven into a fabric by Tetko separator (cumulative thickness of 0.014 inches) comprising Hollingsworth and Voss (H & V) BG 03013 LM 96835 glass fiber papers. The tests were performed on an Instron Model 1130 Universal Testing machine with a crosshead speed of 0.2 in./min., a chart speed of 2.0 in./min. and a gauge length of 1.0 inch. The results are tabulated in Table I and clearly illustrate the superior strength characteristics of the present separator over the prior art material.

TABLE I

| Material | Cumulative Thickness | Tensile Strength |
| --- | --- | --- |
| Tetko 9-70/22 | 0.007" | 31.3 Kg/in. |
| H & V BG 03013 LN 96835 | 0.014" | 3.3 Kg/in. |

EXAMPLE II

Figure 2:
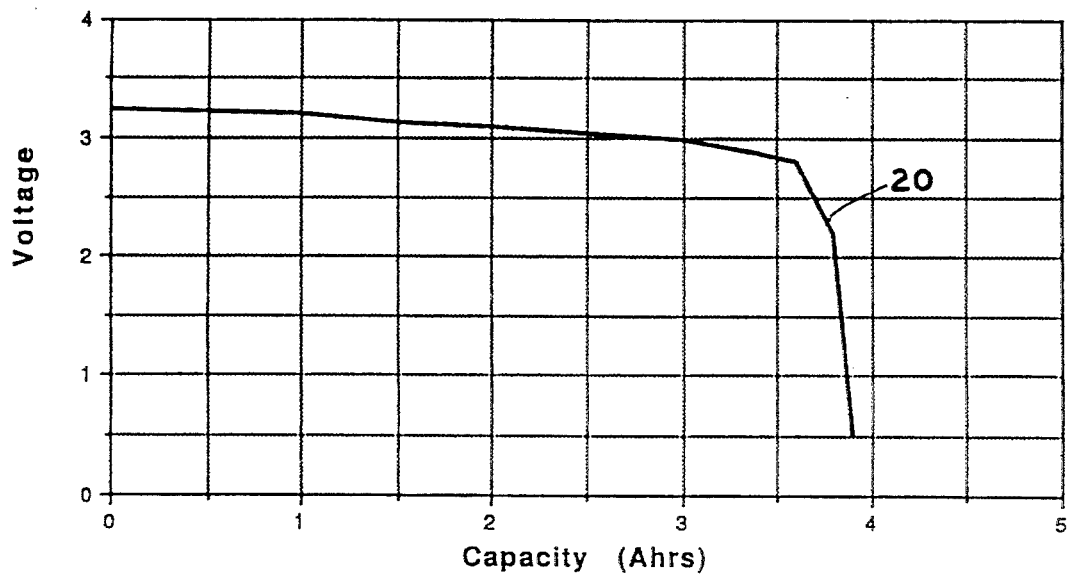
FIG. 2 is a graph constructed from the average discharge curve 20 of a plurality of solid cathode Li/-fluorinated carbon (Li/$CF_x$) cells each having a separator laminate of ceramic fibers and glass fiber paper according to the prior art and discharged at 180° C. and at a load of 301 ohms.

A plurality of alkali metal electrochemical cells utilizing a solid cathode and comprising the Li/fluorinated carbon ($Li/CF_x$) couple were constructed having a liquid electrolyte comprising a suitable electrolyte salt in gamma butyrolactone. A prior art separator comprising a laminate of Kaowool 90105-3 ceramic fiber and Hollingsworth and Voss (H&V) BG 03013 LN 96835 glass fiber papers, providing a cumulative separator thickness of approximately 0.026 inches, was positioned between the electrode components. These cells were discharged at 180° C. with a load of 301 ohms ($\approx$10mA rate). The average discharge curve 20 for these cells is illustrated in FIG. 2.

EXAMPLE III

A separator of Tefzel, polyethylenetetrafluoroethylene (ETFE) halogenated polymeric fiber woven into the fabric designated Tetko 9-70/22 according to the present invention and being approximately 0.007 inches thick with an open mesh area of about 22% was used in a plurality of cells comprising the $Li/CF_x$ couple. Two modifications of the ETFE separator were used. The first had a single layer of Tetko 9-70/22 woven fabric, while the second comprised a laminate of the Tetko 9-70/22 fabric with a layer of Rayperm 200/60 microporous film having a thickness of approximately 0.001 inches, for a cumulative laminate thickness of about 0.008 inches.

Figure 3:
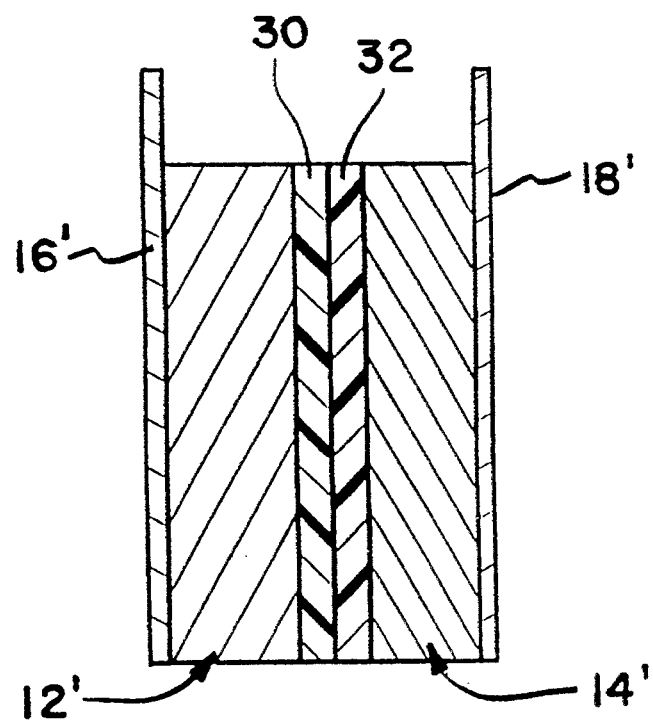
FIG. 3 is a diagrammatic view of an electrochemical cell provided with a laminate separator of woven fabric 30 and microporous film 32 according to the present invention.

The single layer separator made according to the first modification is represented diagrammatically as separator 10 in FIG. 1, and FIG. 3 is a diagrammatic view of a cell similar to that illustrated in FIG. 1 wherein the separator according to the second modification comprises a laminate of woven fabric of halogenated fibers 30 and microporous Rayperm film 32. The Rayperm film was made from ETFE material supplied by Raychem Ltd. The concept behind the use of the fabric/membrane laminate was to further lessen the opportunity for intrusion of the cathode material 14' (FIG. 3) through the fiber network of the woven cloth.

To take advantage of the thinner ETFE material as compared to the prior art laminate separator of Kaowool 90105-3 ceramic fiber and H & V glass fiber papers used in Example II, (cumulative thickness of approximately 0.026 inches), the active material components for the plurality of cells in this example were redesigned to incorporate longer electrodes. The net result was an increase of 20% in the volume of active material as compared to the cells constructed according to Example II.

Figure 4:
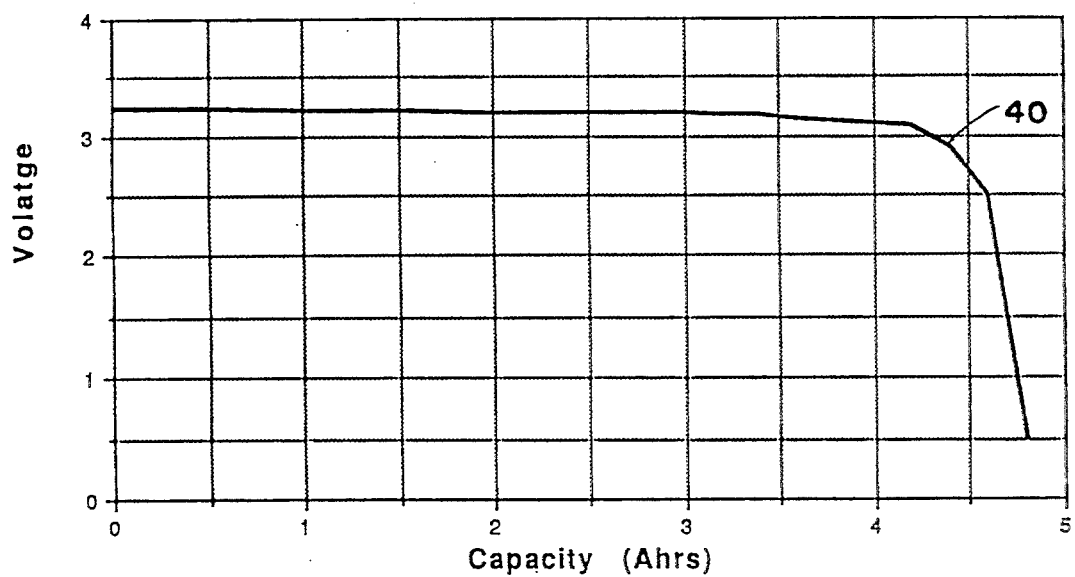
FIG. 4 is a graph constructed from the average discharge curve 40 of a plurality of Li/CF$_x$ cells each having a woven fabric separator made according to the present invention from a halogenated polymeric fiber, which cells were discharged at 180° C. and at a load of 301 ohms.
Figure 5:
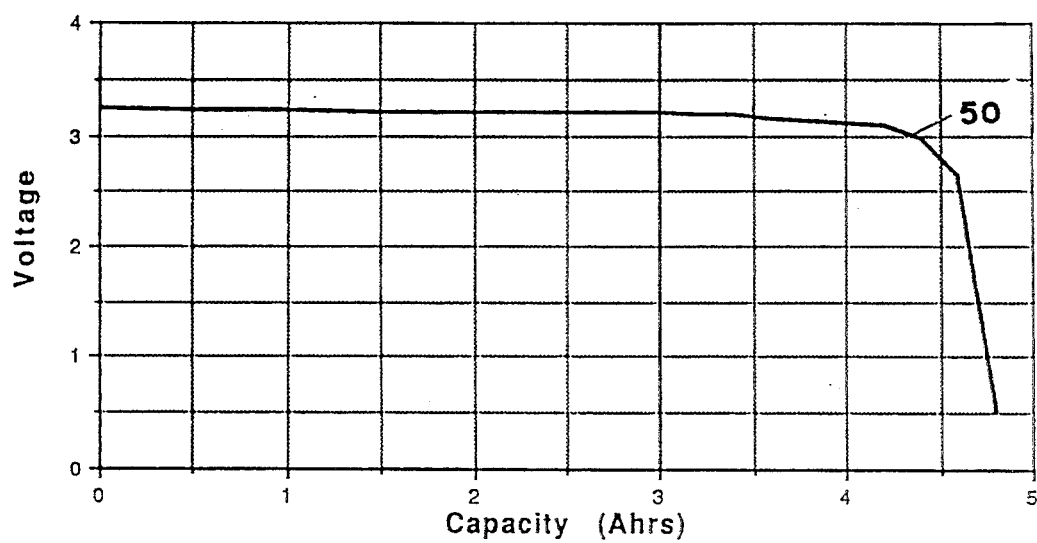
FIG. 5 is a graph constructed from the average discharge curve 50 of a plurality of Li/CF$_x$ cells each having a fabric separator made according to the present invention and comprising a laminate of a woven fabric separator of halogenated polymeric fibers and a microporous film, which cells were discharged at 180° C. and at a load of 301 ohms.

The electrochemical cells having both the single layer separator of woven fabric and the fabric/membrane laminate were then discharged at 180° C. and under loads of 301 ohms ($\approx$10mA rate). The resulting average discharge curves for these cells are illustrated in FIGS. 4 and 5, respectively. Both the cells having the single layer of fabric and the cells having the fabric/membrane laminate were able to fully utilize the additional active material with no apparent degradation in voltage or excessive spread in delivered capacity. This is indicated by the curve designated 40, which is the average discharge in FIG. 4 for the cells comprising the single layer separator of woven fabric and by the curve designated 50 in FIG. 5, which is the average discharge for the cells comprising the fabric/membrane separator laminate.

For the test cells constructed with a woven fabric halogenated polymeric fiber separator as a single layer (FIG. 4) or in a laminate form (FIG. 5), the capacity increase of approximately 20 percent over the prior art cells comprising the $Li/CF_x$ couple with the laminate separator of Kaowool 90105-3 ceramic fiber and H&V glass fiber papers used in Example II, is proportional to the additional mass of active material.

EXAMPLE IV

Figure 6:
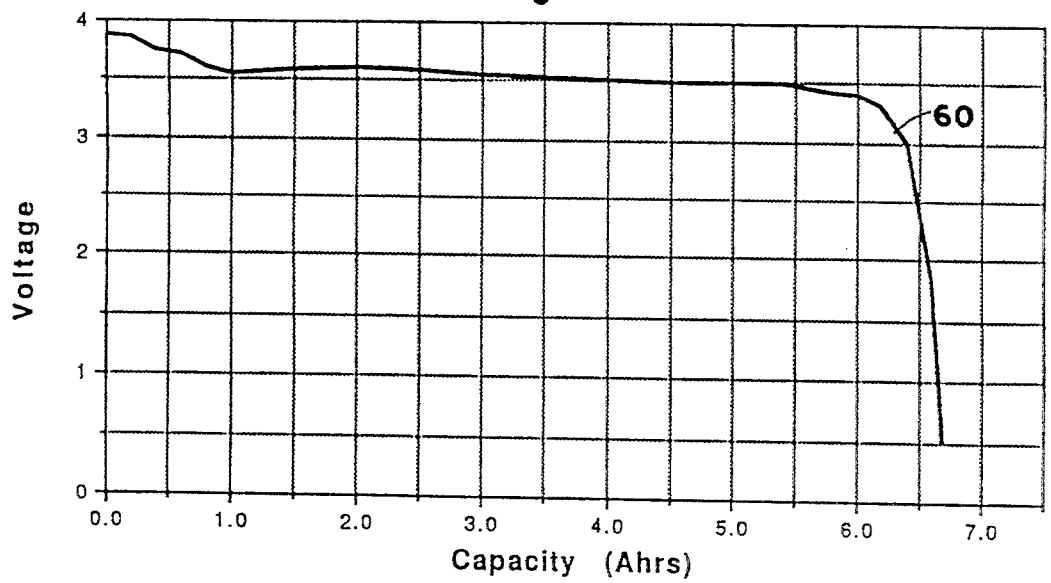
FIG. 6 is a graph constructed from the average discharge curve 60 of a plurality of liquid depolarizer/catholyte Li/thionyl chloride-bromine chloride cells each having a glass fiber paper separator according to the prior art and discharged at 20° C. at a load of 75 ohms.

A plurality of alkali metal electrochemical cells utilizing a liquid depolarizer/catholyte and comprising the Li/thionyl chloride-bromine chloride complex were constructed. These cells used a prior art separator positioned between the electrode components and comprising a single layer of Hollingsworth and Voss (H&V) BG 03013 LN 96835 glass fiber paper separator, having a thickness of approximately 0.007 inches. These cells were then discharged at 20° C. with a load of 75 ohms. The average discharge curve 60 for these cells is illustrated in FIG. 6.

EXAMPLE V

A separator of Tefzel, polyethylenetetrafluoroethylene (ETFE) halogenated polymeric fiber woven into the fabric designated Tetko 9-70/22 according to the present invention and being approximately 0.007 inches thick with an open mesh area of about 22% was used in a plurality of cells comprising the Li/thionyl chloride-bromine chloride couple. This separator was similar to the one used in Example III. The Tetko 9-70/22 woven fabric was combined with a layer of Rayperm 200/60 microporous film, approximately 0.001 inches thick, to form a laminate separator having a cumulative thickness of about 0.008 inches. FIG. 3 is a diagrammatic view of a cell according to this example wherein the separator comprises a laminate of woven fabric 30 and microporous Rayperm film 32. The Rayperm film was provided to further lessen the opportunity for intrusion of the cathode material 14' (FIG. 3) through the fiber network of the woven cloth.

Figure 7:
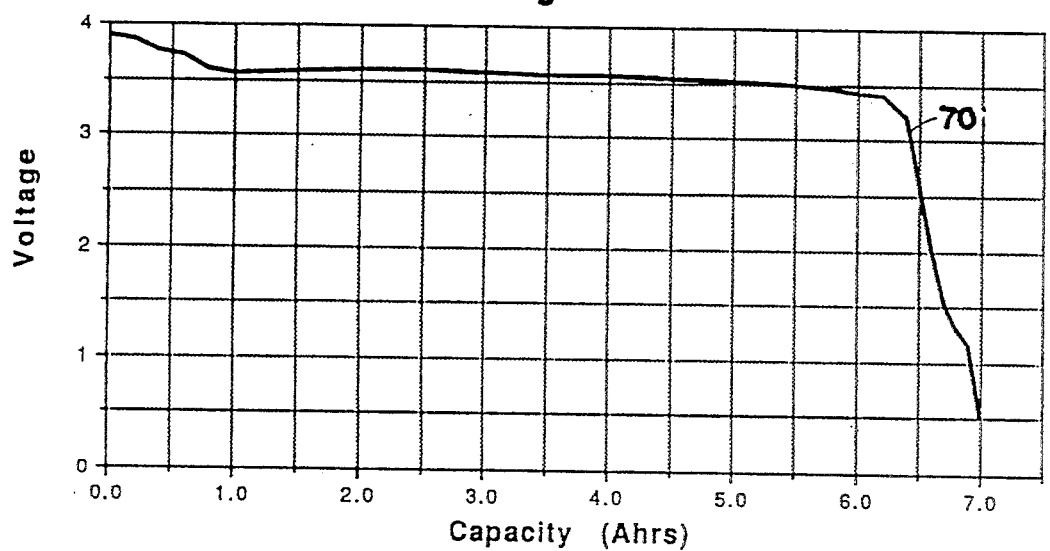
FIG. 7 is a graph constructed from the average discharge curve 70 of a plurality of Li/thionyl chloride-bromine chloride cells each having a fabric separator made according to the present invention comprising a laminate of a woven halogenated polymeric fiber and a microporous film which cells were discharged at 20° C. at a load of about 75 ohms.

The electrochemical cells having the Li/thionyl chloridebiomine chloride complex and provided with the fabric/membrane laminate separator were then discharged at 20° C. and under a load of 75 ohms. The resulting average discharge curve 70 for these cells is illustrated in FIG. 7. No loss in performance was detected in comparison to the prior art separator used in Example IV due to incorporation of the stronger fabric separator in these cells. The discharge conditions were considered normal for this type of cell.

EXAMPLE VI

A separator of Tefzel, polyethylenetetrafluoroethylene (ETFE) halogenated polymeric fiber woven into a fabric according to the present invention by Tetko Inc., Cleveland, Ohio, and designated Tetko 9-130/39 (approximately 0.008 inches thick), was used in a plurality of cells comprising the Li/thionyl chloridebromine chloride couple. This fabric was combined with a single layer of Rayperm 200/60 microporous film, approximately 0.001 inches thick, to form a laminate separator having a cumulative thickness of about 0.008 inches.

FIG. 3 is a diagrammatic view of a cell according to this example wherein the separator comprises a laminate of woven fabric 30 and microporous Rayperm file 32. The Rayperm film was provided to further lessen the opportunity for intrusion of the cathode material 14' (FIG. 3) through the fiber network of the woven cloth in a manner similar to that with respect to the separator used in Example IV.

Figure 8:
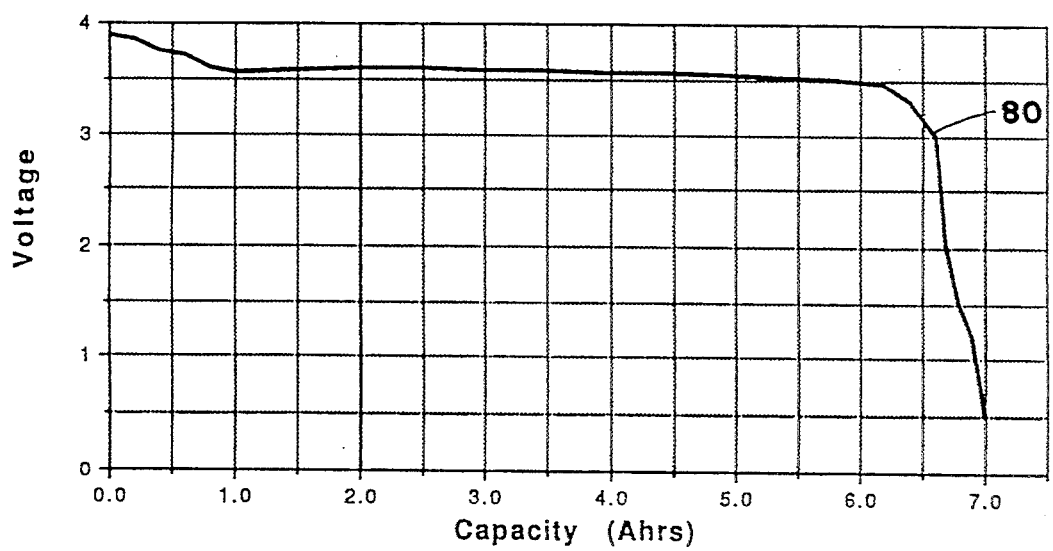
FIG. 8 is a graph constructed from the average discharge curve 80 of a plurality of Li/thionyl chloride-bromine chloride cells each having a fabric separator made according to the present invention comprising a laminate of a second form of a woven fabric separator of halogenated polymeric fiber and a microporous film, which cells were discharged at 20° C. at a load of 75 ohms.

These electrochemical cells were then discharged at 20° C. and under a load of 75 ohms. The resulting average discharge curve 80 for these cells is illustrated in FIG. 8. As was the case in Example V, no loss in performance was detected in comparison to the prior art separator used in Example IV due to the incorporation of the stronger fabric separator in these cells. The discharge conditions were considered normal for this type of cell.

It is appreciated that various modifications to the inventive concepts described herein may be apparent to those of ordinary skill in the art without departing from the spirit and scope of the present invention as defined by the appended claims.

What is claimed is:

1. An electrochemical cell comprising:
   a) an anode body of alkali metal;
   b) a cathode operatively associated with the anode and made of electronically conductive material;
   c) an electrolyte operatively associated with the anode and the cathode; and
   d) a separator provided between the anode and the cathode to prevent internal electrical short circuit conditions, wherein the separator comprises a laminate of a fabric woven from a fluoropolymeric fiber selected from the group consisting of polyvinylidine fluoride, polyethylenetetrafluoroethylene, and polyethylenechlorotrifluoroethylene, and a continuous microporous film.

2. The electrochemical cell of claim 1 wherein the continuous microporous film comprises a fluoropolymeric material.

3. The electrochemical cell of claim 1 wherein the continuous microporous film comprises polyethylenetetrafluoroethylene.

4. The electrochemical cell of claim 1 wherein the anode is selected from the group consisting of lithium, a lithium alloy, sodium, potassium, calcium and magnesium.

5. The electrochemical cell of claim 1 wherein the cathode is made of a solid material selected from the group consisting of manganese dioxide, fluorinated carbon, silver vanadium oxide, titanium disulfide, copper oxide, copper sulfide, iron sulfide and iron disulfide.

6. The electrochemical cell of claim 1 wherein the cathode comprises a liquid selected from the group consisting of sulfur dioxide and an oxyhalide including phosphoryl chloride, thionyl chloride and sulfuryl chloride used individually or in combination with each other or in combination with halogens, interhalogens or other electrochemical promoters or stabilizers.

7. The electrochemical cell of claim 1 wherein the cathode comprises a carbonaceous material with the continuous microporous film of the laminate separator facing the cathode to provide a barrier to any dislodged carbon particles.

8. The electrochemical cell of claim 1 wherein the anode comprises lithium, the cathode comprises a carbonaceous material, the electrolyte comprises bromine trifluoride and the continuous microporous film of the laminate separator faces the cathode to provide a barrier to any dislodged carbon particles.

9. An electrochemical cell comprising:
   a) a lithium anode;
   b) a cathode operatively associated with the anode and made of electronically conductive material;
   c) an electrolyte operatively associated with the anode and the cathode, the electrolyte comprising bromine trifluoride; and
   d) a separator provided between the anode and the cathode to prevent internal electrical short circuit conditions, the separator comprising a fabric woven from a fluoropolymeric fiber selected from one of the group consisting of polyvinylidine fluoride, polyethylenetetrafluoroethylene, and polyethylenechlorotrifluoroethylene.

10. The electrochemical cell of claim 9 wherein the separator comprises a laminate of the woven fabric and a microporous film.

11. The electrochemical cell of claim 10 wherein the microporous film comprises a fluoropolymeric material.

12. The electrochemical cell of claim 10 wherein the microporous film comprises polyethylenetetrafluoroethylene.

13. The electrochemical cell of claim 10 wherein the cathode comprises a carbonaceous material with the continuous microporous film of the laminate separator facing the cathode to provide a barrier to any dislodged carbon particles.

14. An electrochemical cell comprising:
 a) an anode body of alkali metal;
 b) a cathode operatively associated with the anode and made of electronically conductive material;
 c) an electrolyte operatively associated with the anode and the cathode; and
 d) a separator provided between the anode and the cathode wherein to prevent internal electrical short circuit conditions, the separator comprises a fabric woven from a fluoropolymeric fiber selected from the group consisting of polyvinylidine fluoride, polyethylenetetrafluoroethylene, and polyethylenechlorotrifluoroethylene.

15. The electrochemical cell of claim 14 wherein the anode is selected from the group consisting of lithium, a lithium alloy, sodium, potassium, calcium and magnesium.

16. The electrochemical cell of claim 14 wherein the cathode is made of a solid material selected from the group consisting of manganese dioxide, fluorinated carbon, silver vanadium oxide, titanium disulfide, copper oxide, copper sulfide, iron sulfide and iron disulfide.

17. The electrochemical cell of claim 14 wherein the cathode comprises a liquid selected from the group consisting of sulfur dioxide and an oxyhalide including phosphoryl chloride, thionyl chloride and sulfuryl chloride used individually or in combination with each other or in combination with halogens, interhalogens or other electrochemical promoters or stabilizers.

18. A separator for use in an electrochemical cell, the cell comprising an alkali metal anode, an operatively associated cathode and an electrolyte, wherein the separator is provided between the anode and the cathode to prevent internal electrical short circuit conditions, the improvement in the separator comprising:
 a fabric woven from a fluoropolymeric fiber selected from the group consisting of polyvinylidine fluoride, polyethylenetetrafluoroethylene, and polyethylenechlorotrifluoroethylene.

19. The separator of claim 18 wherein the cathode is prevented from physically contacting the anode by the woven fabric separator, the anode being selected from the group consisting of lithium, a lithium alloy, sodium, potassium, calcium and magnesium.

20. The separator of claim 1 wherein the anode is prevented from physically contacting the cathode by the woven fabric separator, the cathode being made of a solid material that is selected from the group consisting of manganese dioxide, fluorinated carbon, silver vanadium oxide, titanium disulfide, copper oxide, copper sulfide, iron sulfide and iron disulfide.

21. The separator of claim 1 wherein the anode is prevented from physically contacting the cathode by the woven fabric separator, the cathode comprising a liquid selected from the group consisting of sulfur dioxide and an oxyhalide including phosphoryl chloride, thionyl chloride and sulfuryl chloride used individually or in combination with each other or in combination with halogens, interhalogens or other electrochemical promoters or stabilizers.

22. A separator for use in an electrochemical cell, the cell comprising a lithium anode, an operatively associated cathode and an electrolyte, wherein the separator is provided between the anode and the cathode to prevent internal electrical short circuit conditions, the improvement in the separator comprising:
 a fabric woven from a fluoropolymeric fiber selected from the group consisting of polyvinylidine fluoride, polyethylenetetrafluoroethylene, and polyethylenechlorotrifluoroethylene.

23. The separator of cell of claim 7 wherein the anode is prevented from physically contacting the cathode by the woven fabric separator, the cathode being made of a solid material that is selected from the group consisting of manganese dioxide, fluorinated carbon, silver vanadium oxide, titanium disulfide, copper oxide, copper sulfide, iron sulfide and iron disulfide.

24. The separator of claim 7 wherein the anode is prevented from physically contacting the cathode by the woven fabric separator, the cathode comprising a liquid catholyte selected from the group consisting of sulfur dioxide and an oxyhalide including phosphoryl chloride, thionyl chloride and sulfuryl chloride used individually or in combination with each other or in combination with halogens, interhalogens or other electrochemical promoters or stabilizers.

* * * * *